Oct. 13, 1953  C. L. EKSERGIAN  2,655,229
DISK BRAKE MECHANISM
Filed Feb. 3, 1951  5 Sheets-Sheet 1

INVENTOR.
Carolus L. Eksergian
BY
Maurice A. Crews
ATTORNEY

Oct. 13, 1953
C. L. EKSERGIAN
2,655,229
DISK BRAKE MECHANISM
Filed Feb. 3, 1951
5 Sheets-Sheet 2
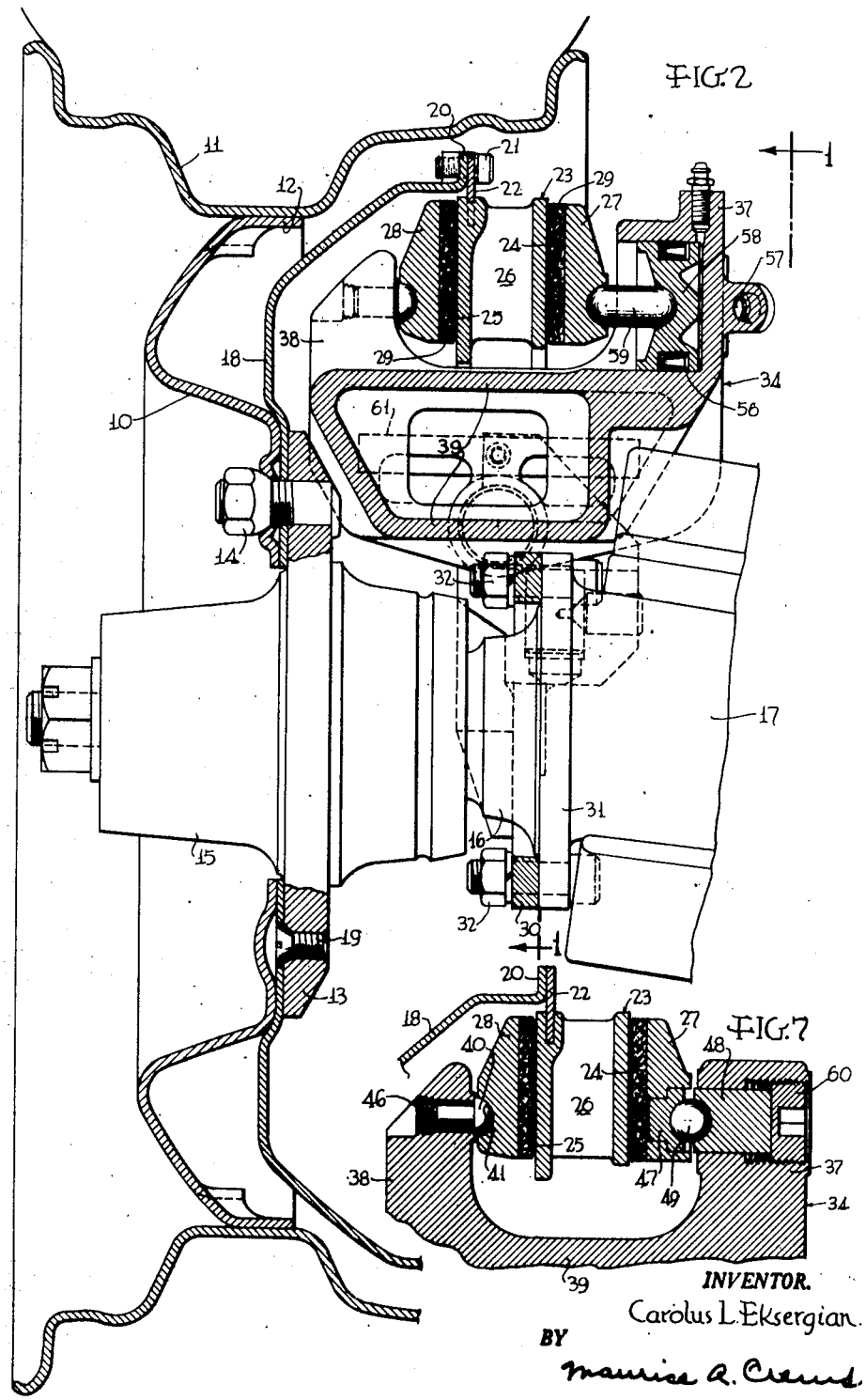
INVENTOR.
Carolus L. Eksergian.
BY
*Maurice A. Creme*
ATTORNEY

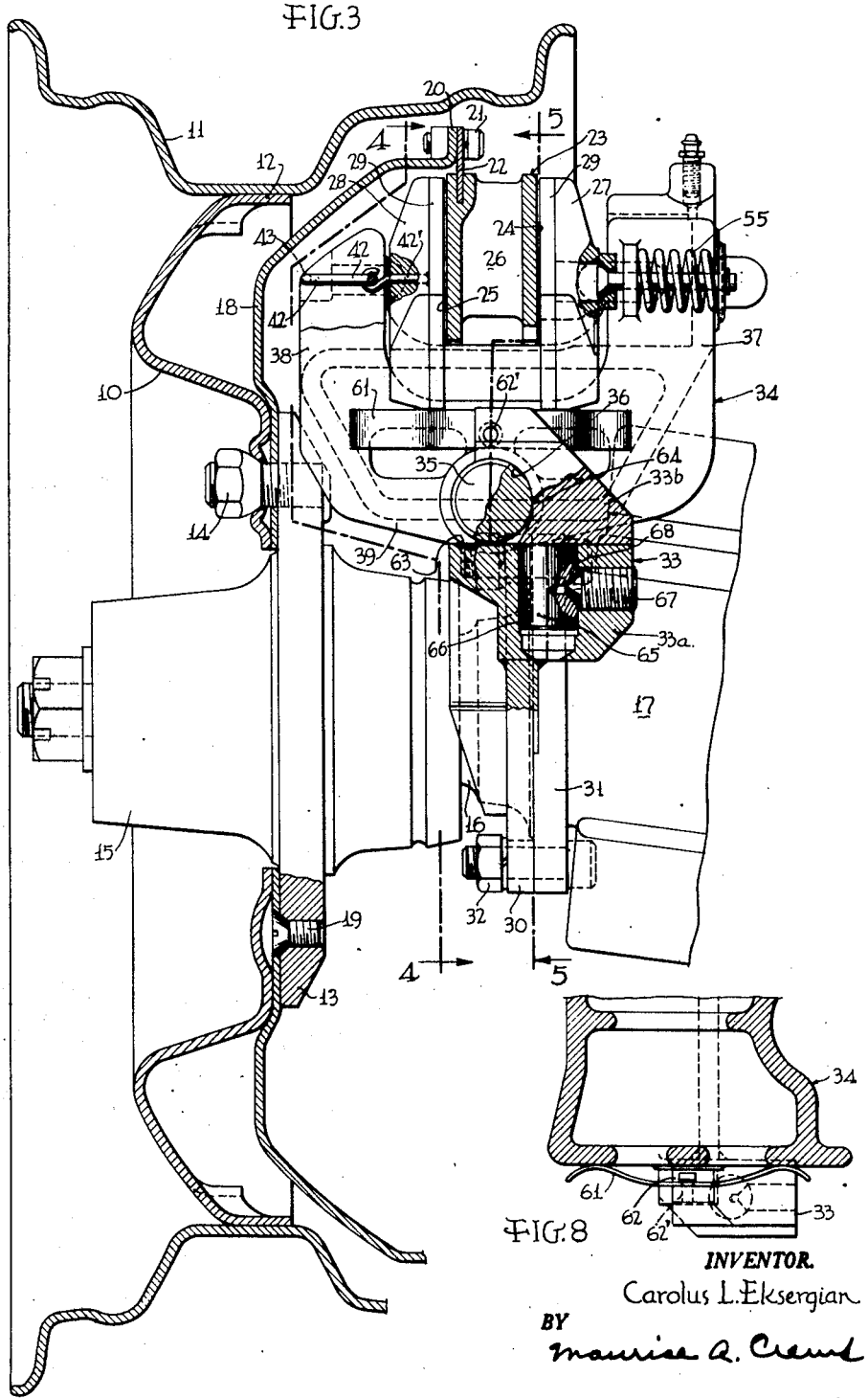

Oct. 13, 1953  C. L. EKSERGIAN  2,655,229
DISK BRAKE MECHANISM
Filed Feb. 3, 1951  5 Sheets-Sheet 4

INVENTOR.
Carolus L. Eksergian
BY
Maurice A. Crewe
ATTORNEY

Oct. 13, 1953

C. L. EKSERGIAN 2,655,229

DISK BRAKE MECHANISM

Filed Feb. 3, 1951

INVENTOR.
Carolus L. Eksergian
BY
Maurice A. Crews
ATTORNEY

Patented Oct. 13, 1953

2,655,229

UNITED STATES PATENT OFFICE 2,655,229

DISK BRAKE MECHANISM

Carolus L. Eksergian, Media, Pa., assignor to The Budd Company, Philadelphia, Pa., a corporation of Pennsylvania Application February 3, 1951, Serial No. 209,235

9 Claims. (Cl. 188—72)

The invention relates to a brake mechanism and more particularly to a brake mechanism of the self-energizing type adapted for use in automotive vehicles.

It embodies a brake mechanism generally similar to that disclosed in co-pending application Serial No. 182,934 filed September 2, 1950, and entitled "Self-Energizing Brake," and relates to certain improved constructions in a brake mechanism of the type shown in that application.

It is among the objects of the invention to provide a brake mechanism of this type which is simple in construction, easy to manufacture and assemble, easy to adjust for wear, and one which is highly efficient in operation and which has long life.

These objects are in large measure achieved by a brake mechanism comprising a brake rotor having opposed annular braking faces, which are preferably radial braking faces, and segmental shoes in cooperative relation to the opposed braking faces, and pivotally carried by a support including a rigid integral U-form clamp embracing the backs of the shoes and mounted pivotally so as to allow it and the shoes to swing or float transversely to the plane of the rotor to a limited extent. The shoes are moved toward each other to effect the braking by manually-operated means associated with at least one of the shoes, and to obtain the self-energizing, at least one of the shoes is moved circumferentially to a limited degree by its frictional engagement with the rotor, after the manual actuation, and is provided with means to force it more firmly into braking engagement, as a result of such circumferential movement, by suitable camming means.

To align the shoes with the cooperative disc faces accurately, and to adjust them for wear, simple aligning and adjusting means are provided, which are preferably associated with the pivotal mounting of the respective shoes.

To facilitate the assembly and disassembly of the brake mechanism, the bearings for the pivots or trunnions of the U-form clamp are preferably open-sided bearings, having means for retaining the trunnions in place after they have been engaged with the bearings. A preferred form of such open-sided bearing is one which extends around the trunnions more than 180° so that the trunnion is positively held in place after the assembly. In this form the bearing is preferably a split bearing, the parts of which are brought together over the trunnion and then securely tied together. In an alternative form, the bearing is open on one side sufficiently to receive the trunnion through the open side thereof and is held in operative position by yielding means, such as a spring pressed plunger.

Simple yielding means are provided for holding the shoes against their pivotal mounting, and in the case of the limited circumferentially-movable shoe, such yielding means also returns the shoe to its normal position after such circumferential movement.

The objects of the invention and the manner in which they are attained will become fully apparent from the following detailed description when read in connection with the drawings forming a part of this specification.

In the drawings:

Fig. 2 is a vertical transverse sectional view, taken substantially on the line 2—2 of Fig. 1, showing the brake mechanism and the wheel with which it is associated; in this view the section through the outboard shoe is taken through one of its pivotal supports;

Fig. 3 is a view generally similar to Fig. 2, but showing parts of the brake mechanism, shown in Fig. 2 in section, in elevation, and other parts broken away and shown in section along planes offset from the plane of section shown in Fig. 2;

Fig. 7 is a fragmentary detail sectional view, the section being taken substantially along the line 7—7 of Fig. 1;

Fig. 8 is a fragmentary sectional plan view showing the spring means for frictionally opposing swinging movement of the U-form shoe supporting clamp;

Figures 1, 6:
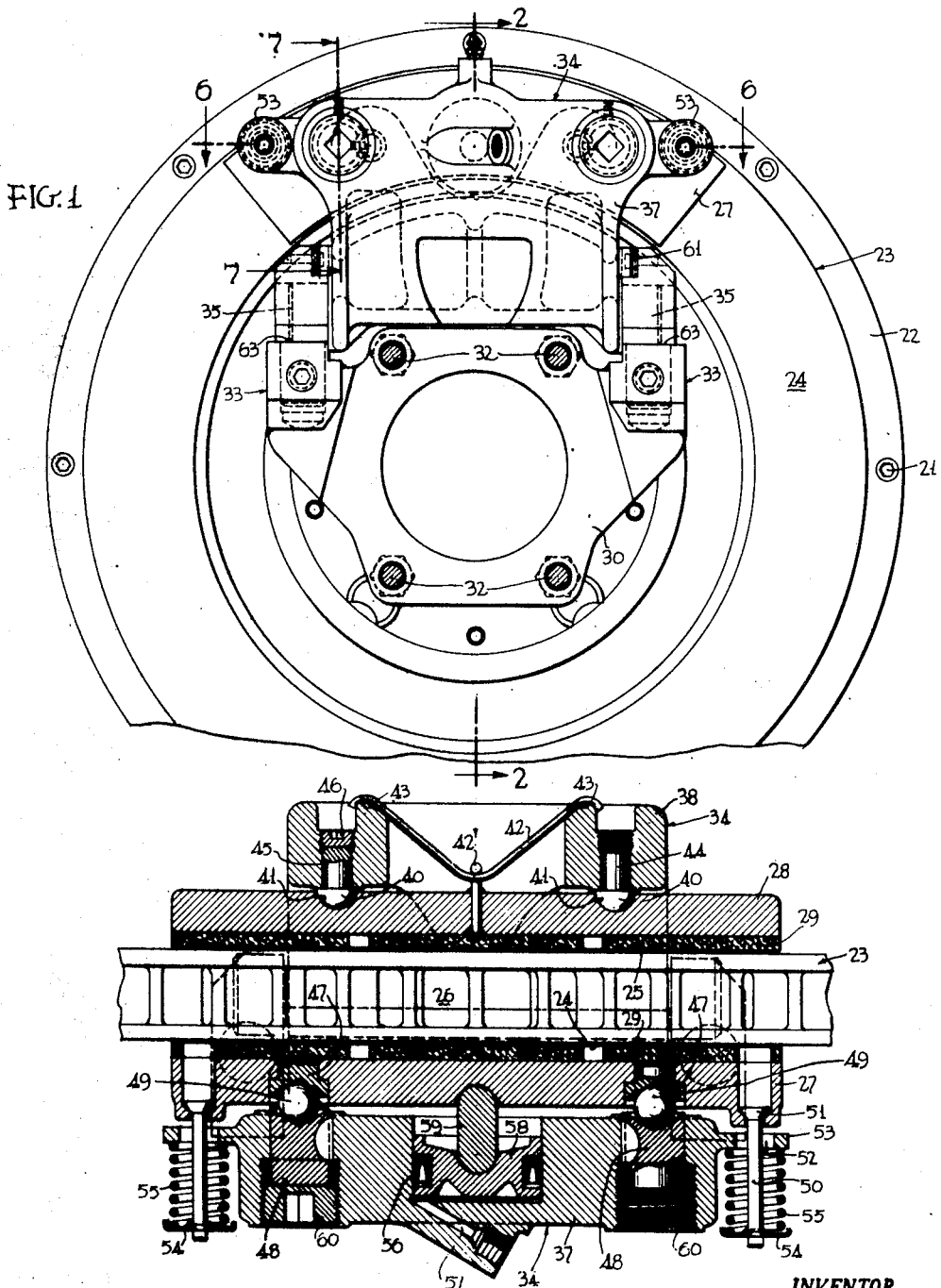
Fig. 1 is an inside elevational view of a brake mechanism according to the invention, the bolts connecting it to the fixed axle being shown in section.
Fig. 6 is a sectional plan view of the brake mechanism, the section being taken substantially along the line 6—6 of Fig. 1.

In the drawings, the brake mechanism embodying the invention has been shown associated with a rear wheel of an automobile, but it will be understood that it is equally applicable to a front wheel or in other relations, if desired.

Referring now to Figs. 2 and 3, the wheel designated 10 is a usual form of disc wheel having a drop center rim 11 seated on and secured in a usual manner to the peripheral flange 12 of the wheel. The wheel is removably mounted on the hub flange 13 by an annular series of bolts, as 14. The hub barrel 15 is non-rotatably secured in a usual manner to the end of the axle 16, and the latter is rotatably mounted in the axle housing 17 through the usual roller bearings, not shown.

The rotating element, or rotor, of the improved brake mechanism comprises a dished supporting plate 18 seated, in this embodiment, against the outer face of the hub flange 13 and held in place by screws, as 19, and the wheel securing bolts 14.

The outer periphery of the supporting plate 18 is flanged radially outwardly at 20, and to this flange is secured, as by the bolts 21, a sheet metal annulus 22, which carries cast thereon a usual form of ventilated cast iron brake ring 23 having opposed inboard and outboard radially extending braking faces 24 and 25, respectively, and the brake cooling passages 26 therebetween.

The deep dish of the supporting plate 18 and the location of the brake ring 23 adjacent the rim leaves ample space radially inwardly between the brake ring and the axle housing for the disposition of the stationary brake mechanism and its support, which are associated with the rotary brake element or rotor just described.

The stationary brake mechanism comprises the segmental opposed inboard and outboard shoes 27 and 28, respectively, each carrying a suitable brake lining, as 29; the shoes being disposed at the top and in cooperative relation with the opposed braking faces 24 and 25 of the rotary brake ring 23. In the present embodiment, the shoes have an angular extent of less than 90°, so that large portions of the braking faces of the rotor are at all times subject to the cooling action of the air flowing past them.

The mounting of the shoes is such as to permit the application of equalized pressure over the entire face of the lining and between it and the associated braking face, and this together with the extensive surfaces of the rotor exposed to cooling air, avoids over-heating of any portion of the brake and the resultant development of heat checks in the rotor.

In the preferred form of the invention shown in Figs. 1 to 8 inclusive, the inboard and outboard shoes 27 and 28 are carried by a support removably secured to the axle housing. This support comprises a radialy inner fixed part 30 fitting flatwise against a flange 31 on the axle housing 17 and removably secured thereto by the bolts 32. The radially inner part 30 is provided fore and aft of the axle with enlarged radially outwardly extending ears, designated generally as 33, these ears flanking a radially outer support part 34 having fore and aft extending trunnions 35 mounted in respective bearings 36 formed in the respective ears 33.

The outer support part 34, as clearly appears in the drawings, is an integral cored casting of substantially U- or C-form, the arms 37 and 38 of which embrace the backs of the respective shoes 27 and 28 and serve as mounting means therefor and the bight 39 of which carries, substantially centrally thereof, the fore and aft extending trunnions 35.

The shoes are pivotally mounted on the respective arms of the U-form support part and in such manner that the pivotal axis lies in a plane normal to the respective shoe and dividing the brake lining into substantially equal area parts disposed on the opposite sides of said plane.

Figure 4:
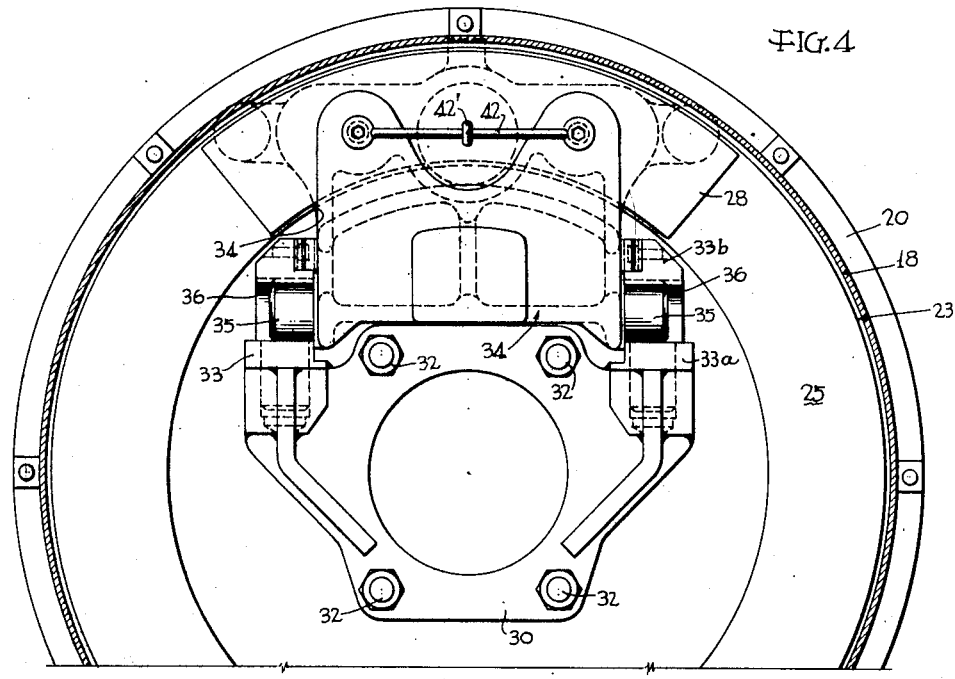
Fig. 4 is an outside elevational view of the brake mechanism, with parts shown in section substantially along the line 4—4 of Fig. 3.
Figure 5:
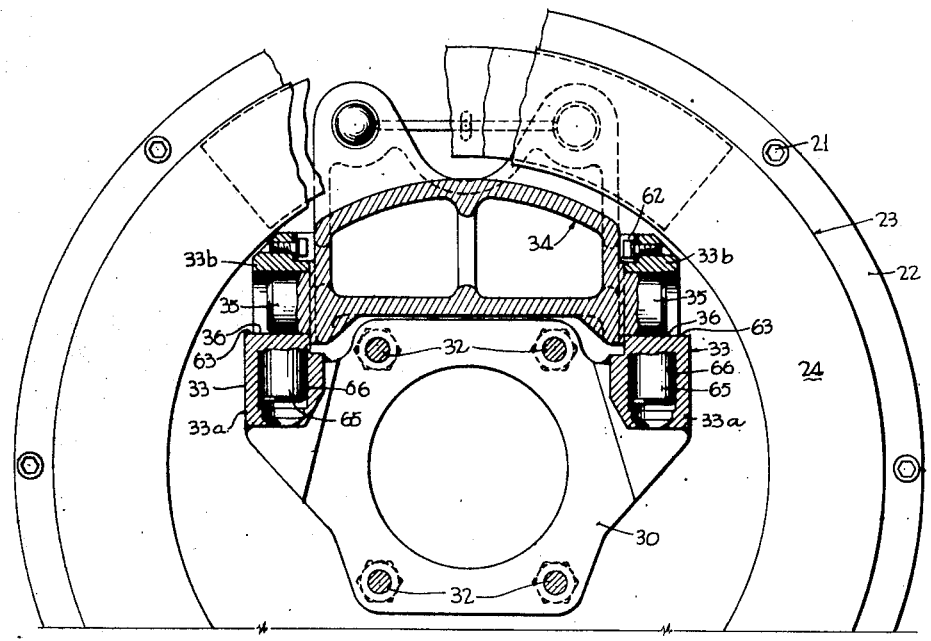
Fig. 5 is an inside elevational view of the brake mechanism with parts broken away and shown in section substantially along the line 5—5 of Fig. 3.

For mounting the outboard shoe 28 spaced semi-spherical protuberances 40 on the arm 38, which is bifurcated as shown in Figs. 4, 5, and 6, engage similar recesses 41, respectively, on the back of the shoe 28. The shoe is yieldingly held in this mounted position by a V-form wire spring 42, whose bight is secured by a staple 42' to the back of the shoe and whose curved ends engage correspondingly recessed seats 43 on the respective furcations of the arm 38 of the U-form support part 34 to hold them in place. It will be seen that this arrangement permits a very easy mounting and demounting of the shoe, because the ends of the spring may be readily engaged or disengaged with their seats 43.

The protuberances are, as shown, preferably made as the heads of pins 44 and 45 fitting into openings in the respective furcations of the arm 38. Because of the spherical mounting, the shoe can readily adjust itself about its longitudinal axis to bear evenly upon the adjacent face 25 of the rotor.

To insure that the shoe is in exact parallelism with the adjacent braking face 25 of the rotor, at least one of the pins, as 45, is made adjustable. This may be done by mounting a screw-threaded plug 46 in a screw-threaded part of the hole in which the pin 45 is located. By screwing this plug in or out, the head of the pin can be made to occupy corresponding positions, to effect the exact parallelism of the shoe and its cooperating braking surface.

The outer shoe 27 is mounted, as in the above referred application, for movement away from arm 37 of the U-form clamp to effect the manually-controlled braking and also for pivotal movement about an axis lying in a plane normal to the shoe and dividing the brake lining into equal parts, as well as for slight circumferential or endwise movement of the shoe to effect a servo-action.

In the plane above referred to are arranged spaced pairs of opposed hardened cam seats, as 47 and 48, arrange respectively, on the back of the shoe and on the arm 37. These spaced cam seats receive a hardened ball, as 49, between them, and the shoe is held in normal position with the balls 49 centered between their respective cam seats by resilient means pressing the shoe against the balls.

Such resilient means may comprise similar spring means arranged adjacent each of the shoe ends. Each such means comprises a bolt 50 having a ball-faced head 51 seated on a corresponding seat on the shoe 27 and extending through an elongated hole 52 in an ear 53 on the arm 37. The end of the bolt opposite the head 51 has a dished washer 54 removably secured thereto, and between this washer and the ear 53 is inserted a compression coil spring 55.

For actuating the brake shoes into braking engagement, a hydraulic cylinder 56 is provided centrally of the arm and shoe, this cylinder actuating the shoe when compressed fluid is admitted through a port 57 into a chamber behind the piston 58 movable into the cylinder. This piston actuates the shoe through a short strut 59 having rounded ends engaging in mating rounded recesses on the piston and the shoes, respectively. See Fig. 6.

With the arrangement just described, if the shoes are manually operated by causing compressed fluid to be admitted behind the piston to force the shoes toward each other, the braking will be initiated by the engagement of the brake shoe linings of the shoes with the opposed faces of the disc, but this initial braking will be greatly augmented by the servo-action which takes place due to the friction between the endwise movable shoe 27 and the adjacent braking face 24. This friction drag causes the shoe 27 to shift endwise and thereby causes the balls 49 to roll up their associated cams to force the shoes into still stronger engagement with the respective braking faces.

Because of the ball-faced engagement of the bolts 50 with the respective ends of the shoe and the elongated holes 52 in the respective ears of the arm 37, such endwise movement is not materially impeded, being opposed only by the springs 55; but as soon as the fluid pressure is released, the brakes will be returned to their inoperative position, shown in Fig. 6, by the springs 55.

The cams 47 and 48 are respectively provided by hardened inserts which are non-rotatably secured in the shoe 27 and arm 37, respectively. The cam inserts 48 on the arm may be adjustably mounted thereon and may be adjusted for aligning the shoe in parallelism with the braking surface 24 or to take up wear by adjusting the screw-threaded plugs 60, one associated with each insert.

The U-form shoe mounting part 34 has slight pivotal or floating movement transversely of the plane of the rotating brake element 23 to take care of equalization of braking pressure between opposing shoes. Normally such movement is restrained by the frictional engagement of leaf springs 61, see Figs. 3, 4, 5 and 8, with the opposite sides of the casting 34. The ends of each spring engages the casting and the intermediate part is secured in a recess 62 on the adjacent ear 33 by a screw and lock washer, generally designated by numeral 62'. Thus the member 34 is held by the springs 61 against flopping back and forth to the extent which would otherwise be allowed when the brakes are off.

To permit the ready assembly and disassembly of the U-form clamp 34 with the attached shoes, the bearing 36 for the trunnions 35 is preferably made a split bearing. To this end, the radially inner portions 33a of the ears 33 are formed with flat radially outer surfaces, as 63, forming the inner parts of the associated bearings and upon which the trunnions 35 are adapted to seat during and after assembly. The radially outer portions 33b of the ears 33 each have an open-sided bearing portion, the radially outer part of which extends outboard beyond the vertical plane through the center of the associated trunnion, see Fig. 2. The inboard side of this bearing has a short radially extending flattened portion 64. When it is desired to free the trunnions, the radially outer portions 33b of the bearing-forming ears 33 are raised away from the radially inner parts 33a, and this is permitted by the short flattened portions 64, after which the trunnions 35 can be withdrawn in an outboard direction from the bearings 36.

The radially outer bearing parts 33b are secured to the radially inner portions 33a through pins 65 on the former, entering holes 66 in the latter. The pins 65 are locked in place against lengthwise movement and against turning by taper-ended screw plugs 67, Fig. 3, carried by the radially inner parts 33a of the ears 33, the tapered ends being adapted to seat in correspondingly tapered recesses 68 in the respective pins 65.

Figure 9:
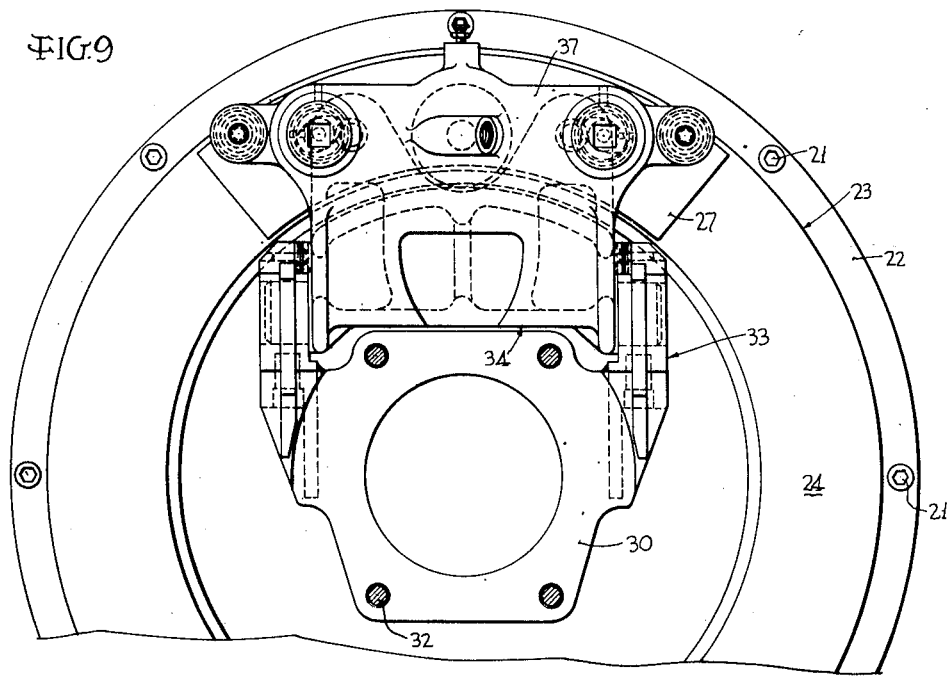
Fig. 9 is a view similar to Fig. 1, showing a modified support for the shoes.
Figure 10:
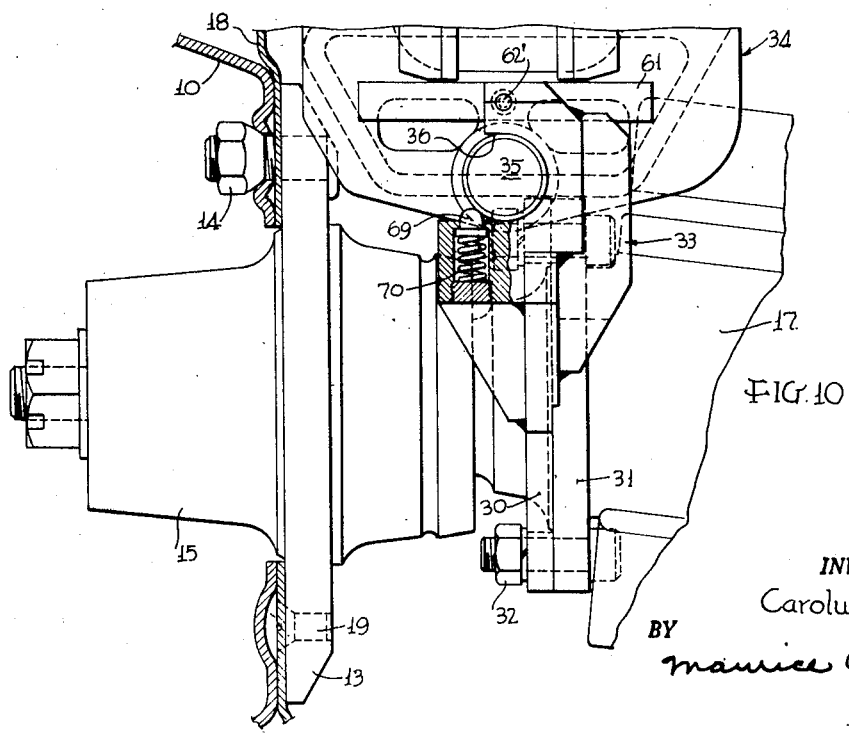
Fig. 10 is a fragmentary view similar to Fig. 3, showing the modification of Fig. 9 with parts broken away and shown in section.

Referring now to the modification shown in Figs. 9 and 10, similar parts are similarly numbered. In this form the ears 33 are integral structures and not divided into radially outer and inner parts as in the preferred form.

The bearings 36 for the trunnions are open on their outboard side sufficiently to permit movement of the trunnions 35 through this open side. Resilient means are provided for holding the trunnions in place after assembly. Such means are shown as consisting of a spring-pressed rounded-end plunger, a 69, pressed to its operative position by a spring 70. The rounded end of this plunger allows it to be cammed aside, when sufficient force is applied to move the trunnion to or from its operative engagement with the bearing. This arrangement has the advantage of greater simplicity of construction over the preferred form, but it lacks the positive holding of the trunnions in their bearings made possible by that form. The objects of the invention are, nevertheless, for all practical purposes, achieved by this modified form to substantially the same degree as in the preferred form.

The operation of the improved brake will now be briefly described:

To apply the brake, the operator manually initiates the braking action, as by operating a suitable pedal, which in turn actuates a master cylinder of a hydraulic system to supply hydraulic pressure, through port 57 and the chamber in cylinder 56 with which it communicates, to the piston 58 to move it laterally and thereby force the lining 29 of shoe 27 through strut 59 into engagement with the radial face 24 of the brake ring 23. Thereupon, further movement of the piston will rock the U-form support 34 on its trunnions 35 until the other shoe 28 is also brought into engagement with the opposed radial face 25 of the ring. Braking pressure will now be transmitted in balanced relation to the opposite faces of the discs. The frictional drag of the shoe 27 on the rotating brake ring will then cause the shoe to rotate a slight distance with the ring and, in such slight rotary movement, the balls 49 will ride up on the cams 47, 48 associated with the respective balls and increase the braking force over that due to the manually controlled hydraulic pressure.

Since the shoes 27, 28 are pivotally supported in planes normal to the respective shoes and dividing the area of the brake lining into substantially equal portions, the pressure on the rotary ring will be equally distributed, and this minimizes the possibility of unduly heating localized areas and the likelihood of heat checking the brake ring.

When the hydraulic pressure is released by the operator, the springs 55, which were further compressed when the brakes were applied, will separate the shoes 27 and 28 to remove the braking pressure on the ring 23, these springs at the same time, through the action of the balls 49 and their associated cams, returning the shoe 27 rotarily to the starting position shown in Fig. 6.

While several specific forms of the invention have been herein described in detail, it will be understood that changes and modifications may be made by those skilled in the art without departing from the spirit and scope of the invention as set forth in the appended claims.

What is claimed is:

1. In combination, a brake rotor having opposed radial braking faces, segmental shoes for cooperation with the respective faces, a support for the shoes comprising a member of integral U-form embracing the shoes and mounted for limited floating movement of its outer ends transversely to the plane of the rotor, one of said shoes being pivoted to one arm of the U so as to have movement about an axis extending chordwise at the mid-portion of the shoe and the other shoe being carried by the other arm of the U so as to have movement away from said arm, pivotal movement about an axis extending chordwise at the mid-portion of the shoe and slight circumferential or lengthwise movement with respect thereto, manually-controlled means for moving the said other shoe away from the arm to apply the shoe and through movement of the U-frame to also apply the other shoe, and means between said arm and said other shoe for causing a servo-action to increase the braking force when the frictional engagement of the shoe with the rotor tends to drag the shoe around with the rotor.

2. In combination, a brake rotor having opposed radial braking faces, segmental shoes for cooperation with the respective faces, support means for the shoes including an integral U-form member embracing the shoes and pivotally mounted for limited floating movement of its outer ends transversely to the plane of the rotor, one shoe being pivoted on one arm of the U so as to have movement about an axis extending chordwise at the mid-portion of the shoe and the other on the other arm of the U so as to have movement about an axis extending chordwise at the mid-portion of the shoe, means for yieldingly maintaining said shoes spaced apart a predetermined distance, and means associated with one of the arms of the U for forcing said shoes into braking engagement with the rotor under manual control, the U-form member turning about its pivot and the shoes turning about their pivots in this action, at least one of said shoes being movable endwise by the frictional engagement with the rotor due to the manually-controlled means, and means operative upon such movement for applying still greater braking force to the shoes.

3. In combination, a brake rotor having opposed radial braking faces, segmental shoes for cooperation with the respective faces, support means for said shoes including a U-form clamp embracing the shoes and mounted for limited floating movement of its outer ends transversely to the rotor, means for normally holding the shoes spaced a predetermined distance apart, one shoe being pivoted to one of the arms of the U so as to have movement about an axis extending chordwise at the mid-portion of the shoe and the other shoe being pivoted to the other arm of the U so as to have movement about an axis extending chordwise at the mid-portion of the shoe, said last-named shoe having as its pivotal connection to the arm, ball and cam means located at spaced points lengthwise of the shoe, and said last-named shoe being movable endwise on the initial application of the brake to cause the balls to ride up the cams and thus increase the braking force, and yielding means connecting the opposite end portions of said last-named shoe to the adjacent arm of the U for returning it and the balls to their inoperative positions.

4. In combination, a brake rotor having opposed radial braking faces, segmental shoes for cooperation with the respective faces, support means for the shoes including a U-form integral clamp embracing the backs of the shoes, said clamp being pivoted on an axis in a plane parallel to the plane of the rotor for limited movement transversely of said plane of the rotor, the shoes being pivotally carried from the respective arms of the U so as to have movement about an axis extending chordwise at the mid-portion of the respective shoes and with the pivot axis in a plane normal to the braking face of the respective shoe and dividing said face into substantially equal parts, the pivotal connection for at least one of the shoes including longitudinally spaced pairs of opposed cams on the shoe and arm, respectively, with a cooperative ball interposed between the opposed cams and the shoe being free to move endwise to a limited extent, upon manually applied braking force, to cause the balls to ride up the associated cams to apply the brakes with increased force.

5. In combination, a brake rotor having opposed radial braking faces, segmental shoes for cooperation with the respective faces, and a support means for the shoes including an integral U-form clamp embracing the backs of the shoes, means associated with the shoes for holding them normally spaced apart, said U-form clamp being provided with trunnions, a fixed part having open sided bearings for said trunnions, whereby the clamp, shoes, and means for holding them spaced apart may be assembled or disassembled as a unit from said bearings, and means for releasably holding said trunnions for removal laterally from said bearings.

6. In combination, a brake rotor having opposed radial braking faces, segmental shoes for cooperation with the respective faces of the rotor, and support means for the shoes including an integral U-form clamp embracing the backs of the shoes, means associated with the shoes for holding them normally spaced apart, said U-form clamp carrying trunnions having an axis disposed in the plane of the rotor, means providing split bearings to receive said trunnions so as to allow limited tilting movement of the clamp transversely to the plane of the rotor, and means for releasably holding said trunnions for removal laterally from said bearings.

7. In combination, a brake rotor having opposed radial braking faces, segmental shoes for cooperation with the respective faces of the rotor, and support means for the shoes including open sided bearings, trunnions received in said bearings and carrying an integral U-form clamp embracing the backs of the shoes and to which the shoes are pivotally connected, and yielding means pressed aside when the trunnions are moved through the open side of the bearings for yieldingly maintaining the trunnions in operative relation to the respective bearings.

8. In combination, a brake rotor having opposed radial braking faces, segmental shoes for cooperation with the respective faces of the rotor, and a support means for the shoes pivotally mounting the shoes and including an integral U-form clamp embracing the backs of the shoes, means for relatively moving the shoes toward each other to effect the braking and means for normally holding them spaced apart, said clamp being formed with trunnions mounted in spaced bearings on an axis disposed in the plane of the rotor, whereby the clamp can swing transversely of the plane of the rotor to a limited extent.

9. In combination, a brake rotor having opposed radial braking faces, segmental shoes for cooperation with the respective faces of the rotor, and a support means for the shoes pivotally mounting the shoes and including an integral U-form clamp embracing the backs of the shoes, means for relatively moving the shoes toward each other to effect the braking and means for normally yieldingly holding them apart, said clamp being formed with runnions mounted in spaced bearings on an axis disposed in the plane of the rotor, whereby the clamp can swing transversely of the plane of the rotor to a limited extent, and yielding means for frictionally opposing such swinging movement of the clamp.

CAROLUS L. EKSERGIAN.

References Cited in the file of this patent

UNITED STATES PATENTS

| Number | Name | Date |
|---|---|---|
| 1,855,629 | Heiney | Apr. 26, 1932 |
| 2,351,041 | Hawley | June 13, 1944 |
| 2,373,572 | Lambert | Apr. 10, 1945 |